United States Patent [19]
Matsuura

[11] Patent Number: 6,009,308
[45] Date of Patent: Dec. 28, 1999

[54] SELECTIVE CALLING RECEIVER THAT TRANSMITS A MESSAGE AND THAT CAN IDENTIFY THE SENDER OF THIS MESSAGE

[75] Inventor: Tatsuya Matsuura, Shizuoka, Japan

[73] Assignee: NEC Corporation, Tokyo, Japan

[21] Appl. No.: 08/879,779

[22] Filed: Jun. 20, 1997

[30] Foreign Application Priority Data

Jun. 21, 1996 [JP] Japan .................................. 8-162129

[51] Int. Cl.⁶ .................................................. H04M 11/00
[52] U.S. Cl. ........................ 455/31.3; 455/38.4; 455/566; 340/825.44
[58] Field of Search .................................. 455/567, 566, 455/31.2, 31.3, 32.1, 38.2, 38.4; 340/825.44; 379/353, 354, 355, 356

[56] References Cited

U.S. PATENT DOCUMENTS

| | | | |
|---|---|---|---|
| 5,099,507 | 3/1992 | Mukai et al. ............................ | 455/31.2 |
| 5,117,449 | 5/1992 | Metroka et al. ......................... | 455/567 |
| 5,192,947 | 3/1993 | Neustein ............................. | 340/825.44 |
| 5,257,307 | 10/1993 | Ise ......................................... | 455/31.3 |
| 5,493,285 | 2/1996 | Yoshizawa ......................... | 340/825.44 |
| 5,535,427 | 7/1996 | Miyashita et al. ...................... | 455/38.2 |
| 5,561,702 | 10/1996 | Lipp et al. .............................. | 455/31.2 |
| 5,602,908 | 2/1997 | Fan ......................................... | 379/199 |
| 5,604,492 | 2/1997 | Abdul-Halim ...................... | 340/825.44 |
| 5,652,572 | 7/1997 | Kido et al. .......................... | 340/825.44 |
| 5,848,362 | 12/1998 | Yamashita ............................... | 455/567 |

FOREIGN PATENT DOCUMENTS

| | | |
|---|---|---|
| 0589417 | 3/1994 | European Pat. Off. ....... H04M 11/02 |
| 60-142545 | 9/1985 | Japan . |
| 62-5742 | 1/1987 | Japan . |
| 64-47137 | 2/1989 | Japan . |
| 2-43045 | 3/1990 | Japan . |
| 2-44438 | 3/1990 | Japan . |
| 2-44459 | 3/1990 | Japan . |
| 5-65142 | 8/1993 | Japan . |
| 2280769 | 2/1995 | United Kingdom ............. H04Q 7/14 |

*Primary Examiner*—Reinhard J. Eisenzopf
*Assistant Examiner*—Duc Nguyen
*Attorney, Agent, or Firm*—Young & Thompson

[57] ABSTRACT

A selective calling receiver detects a message and information identifying the sender, from the radio signal when the judgement circuit judges the received selective calling number is the same as the receiver's own selective calling number. After detecting, a display indicates the detected message and sender's information, and a call notification circuit notifies a user of calling. The receiver may indicate the name assigned to the received sender's telephone number as the sender's information. The receiver may perform emergency call notification when the received message is an emergency message indicated by an emergency code number. Further, the receiver may be modified such that the notification circuit performs different types of call notification indicated by the notification indicator assigned to the sender's telephone number.

17 Claims, 8 Drawing Sheets

| OUTPUT DATA FROM CONTROLLER 8 | | | | OUTPUT DIAL NUMBER FROM TONE DIALER 142 |
|---|---|---|---|---|
| D4 | D3 | D2 | D1 | |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 0 |
| 1 | 0 | 1 | 1 | * |
| 1 | 1 | 0 | 0 | # |

FIG. 5

| ADDRESS NO. | PREDETERMINED CONE NO. | PREDETERMINED MESSAGE |
|---|---|---|
| 01 | 01 | WAITING FOR YOUR CALL |
| 02 | 02 | I WILL BE LATE |
| 03 | 03 | CHANGE OF PLAN |
| 04 | 04 | MEETING EXTENDED |
| 05 | 05 | AT HOME |
| 06 | 06 | ON DUTY |
| ... | ... | ..... |
| 21 | 21 | WAIT AT THE STATUE |
| ... | ... | ..... |

| TELEPHONE NUMBER SELECTION? <YES> = NO |
|---|
| |

FIG. 10A

| A B C D E F G H I J K L M N O P Q R |
|---|
| <,>=MOVE UNDERSCORE ▽=DISPLAY TEL. DIRECTORY |

FIG. 10B

| AOKI= 03-1234-5678 |
|---|
| ▽ = DISPLAY TEL. DIRECTORY   SET = SELECT |

FIG. 10C

| AOKI= 03-1234-5678     SELECTED |
|---|
| |

FIG. 10D

| 01 = WAITING A TELEPHONE CALL |
|---|
| |

FIG. 10E

| 21 = WAIT AT THE STATUE |
|---|
| |

FIG. 10F

| WAIT AT THE STATUE |
| --- |
|  |

FIG. 10G

| AOKI = 03-1234-5678 WAIT AT THE STATUE |
| --- |
| SET = PB DIAL     MENU = CANCEL |

FIG. 10H

| AOKI = 03-1234-5678   TRANSMISSION COMPLETED |
| --- |
| SET = TRANSMIT MESSAGE     MENU = CANCEL |

FIG. 10I

| WAIT AT THE STATUE   TRANSMISSION COMPLETED |
| --- |
|  |

FIG. 10J

| WAIT AT THE STATUE     MATSUURA |
| --- |
|  |

FIG. 11

| CALL ME SOON     MATSUURA |
| --- |
| 987-65-4321 |

FIG. 14

| ADDRESS NO. | EMERGENCY CODE | PREDETERMINED CONE NO. | PREDETERMINED MESSAGE |
|---|---|---|---|
| 01 | 0 | 01 | WAITING FOR YOUR CALL |
| 02 | 0 | 02 | I WILL BE LATE |
| 03 | 1 | 03 | CHANGE OF PLAN |
| 04 | 0 | 04 | MEETING EXTENDED |
| 05 | 0 | 05 | AT HOME |
| 06 | 0 | 06 | ON DUTY |
| . . . | . . . | . . . | . . . . . |
| 21 | 1 | 21 | GATHERING URGENT |
| . . . | . . . | . . . | . . . . . |

FIG. 12

| ADDRESS NO. | NAME | TELEPHONE NUMBER | SOUND |
|---|---|---|---|
| 01 | AOKI | 03-1234-5678 | TONE 1 |
| 02 | AMANO | 0537-23-4567 | TONE 2 |
| 03 | IIDA | 045-234-5678 | MELODY 1 |
| 04 | ETO | 0467-23-4567 | MELODY 2 |
| . . . | . . . | . . . . . | . . . . . |

FIG. 13

SELECTIVE CALLING RECEIVER THAT TRANSMITS A MESSAGE AND THAT CAN IDENTIFY THE SENDER OF THIS MESSAGE

BACKGROUND OF THE INVENTION

1. Field of the Invention

The present invention relates to a selective calling receiver, and more particularly, to a selective calling receiver that can also transmit a message.

2. Description of Related Art

In recent years, conventional selective calling receivers (also known as "pager" and hereinafter referred to as "receiver") have also been adapted to transmit a message to a counterpart receiver. This is accomplished by a technique referred to hereinafter as "tone dialling", in which the receiver is adapted to emit a series of audible tones representing the contact number of the counterpart receiver, as well as the message to be sent. Such a receiver is held near the microphone of a conventional land-line telephone or cellular phone, to cause the phone to actually establish contact with the counterpart receiver.

As an example, Japanese Utility Model Laid Open No. H2-44459 of Mar. 27, 1990 discloses a receiver that automatically transmits a sender's telephone number stored therein to a counterpart receiver, but only when the receiver does not also transmit a message.

Figure 1:
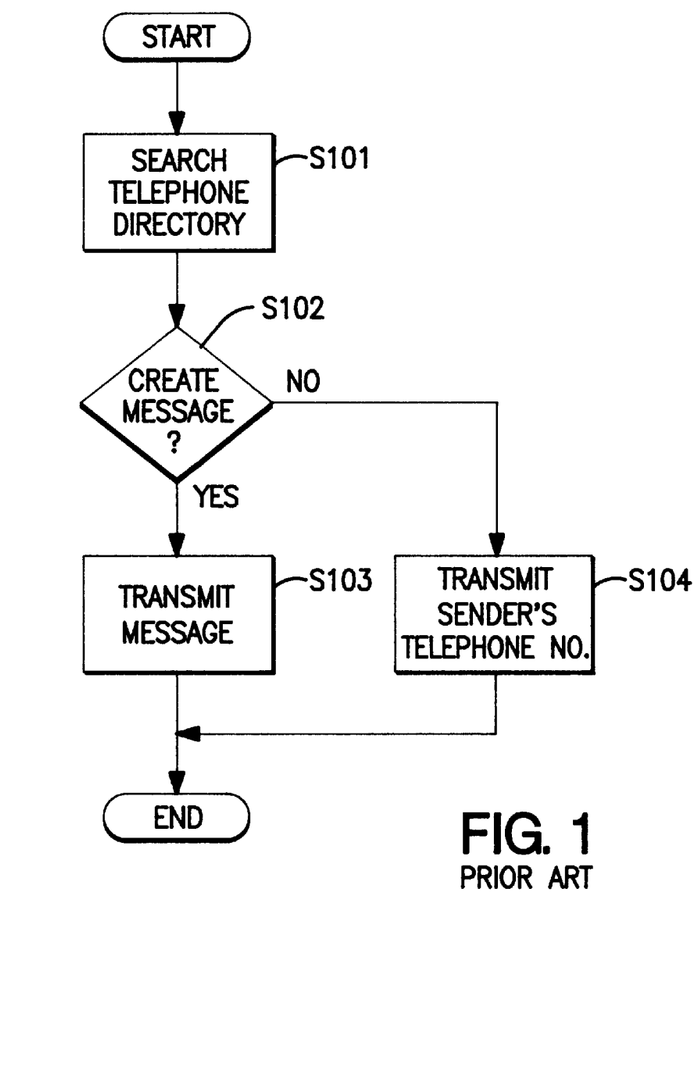
FIG. 1 is a flowchart for explaining a process of transmitting a message or a sender's telephone number according to the prior art.

In FIG. 1, when in transmitting mode, the sending receiver searches a telephone number of a counterpart (the recipient) from a telephone directory for selecting the number of the intended recipient (STEP S101). After deciding the number of the recipient, the sender judges whether the message is created or not (S102). If a message is created, the sender generates the dial tone of recipients telephone number from a speaker for calling and transmits a message (S103). On the other hand, if the message is not created at S102, the sender generates the dial tone from a speaker and transmits only the sender's telephone number.

In this manner, since the sender transmits its telephone number, a recipient can know who is calling.

However, in this receiver, the sender only transmits its telephone number when a message is not created.

SUMMARY OF THE INVENTION

An object of the present invention is provided a selective calling receiver that transmits a sender's message and that can also identify the sender of this message.

Another object of the present invention is a selective calling receiver that displays a sender's name.

Another object of the present invention is a selective calling receiver that can identify and give priority to an emergency call.

It is still another object of the present invention to provide a selective calling receiver which can change the manner of call notification based on the identity of the sender.

To this end, a selective calling receiver of the present invention includes a judgement circuit for judging whether a received radio signal includes the receiver's own selective calling number, a detector for detecting a message and the sender's information from the radio signal when the judgement circuit judges the received selective calling number is the same as the own selective calling number, a display for indicating the detected message and sender's information, and a call notification circuit for notifying a user that a call has been received.

The receiver of the present invention may include a telephone directory memory for storing a plurality of telephone numbers, and a plurality of names assigned to the plurality of telephone numbers and a converter for converting the telephone number of the sender to the name assigned to the telephone number, and the display for indicating the converted name.

The receiver of the present invention may include a predetermined code message memory for storing an emergency code number ("No."). for indicating an emergency message assigned to a predetermined message, and a notification circuit for performing emergency call notification when the received message is the emergency message indicated by the emergency code No.

The receiver of the present invention may be modified so that the telephone directory memory stores notification indicators assigned to the plurality of telephone numbers and so that the notification circuit performs different types of call notifications indicated by the different notification indicators.

BRIEF DESCRIPTION OF THE DRAWINGS

These and other objects, features and advantages of the present invention will become more fully apparent from the following detailed description taken in conjunction with the accompanying drawings, in which.

DETAILED DESCRIPTION OF PREFERRED EMBODIMENTS

Figure 2:
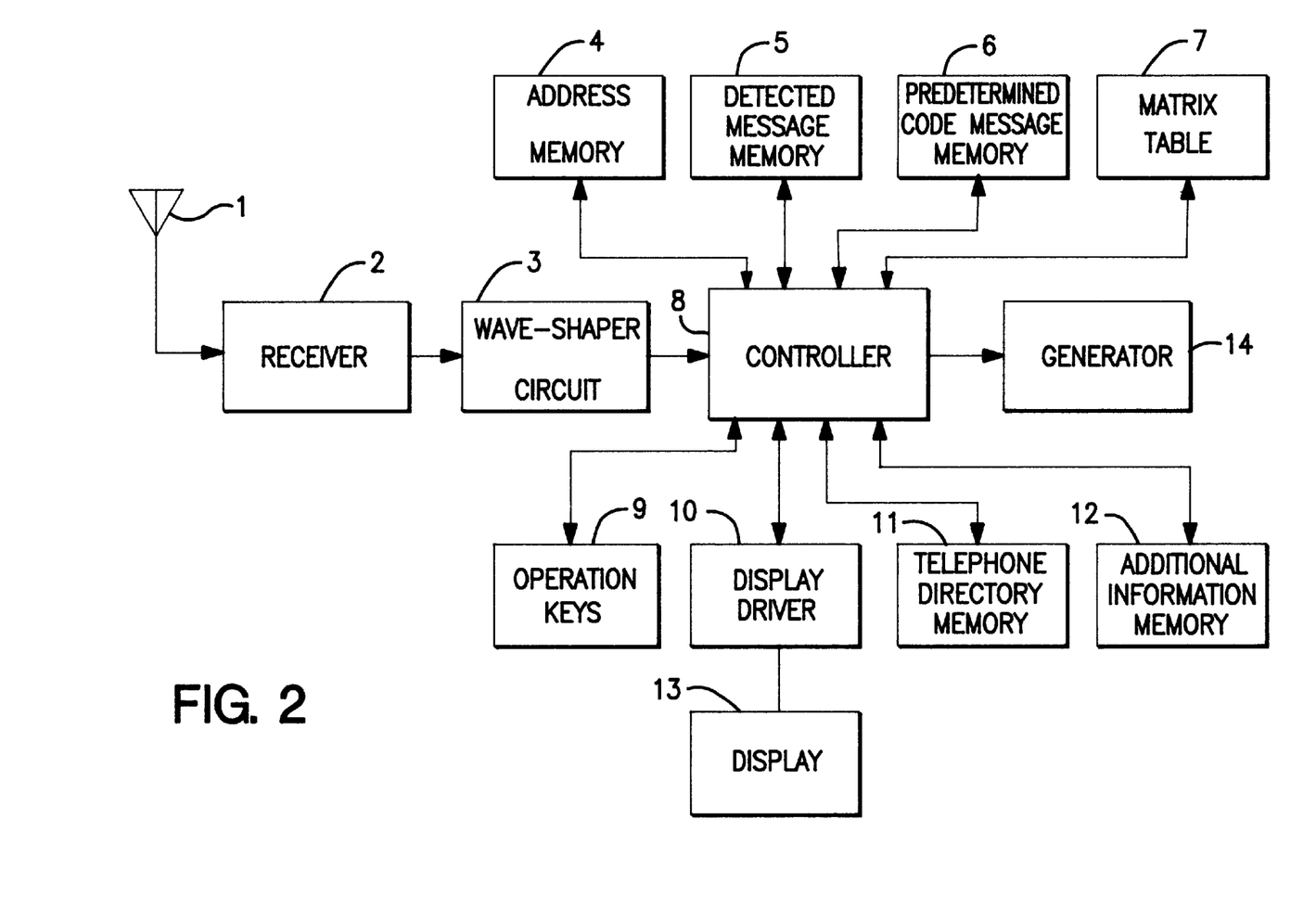
FIG. 2 is a functional block diagram of a selective calling receiver showing an embodiment according to the present invention.

In FIG. 2, an antenna 1 receives a radio signal from a base station (not shown), and supplies a received signal to a receiver 2. The receiver 2 amplifies the received signal and demodulates it, and outputs a demodulated signal to a wave-shaper circuit 3. The wave-shaper circuit 3 wave-shapes the demodulated signal to a digital signal, and supplies the digital signal to a controller 8.

An address memory 4 stores the receiver's own selective calling numbers and outputs to the controller 8 a selective calling number assigned to an address which is specified by the controller 8. A detected message memory 5 stores a detected message supplied from the controller 8. A predetermined code message memory 6 stores various predetermined messages assigned to respective predetermined codes, and outputs to the controller 8 a predetermined message and a predetermined code assigned to an address specified by the controller 8. A matrix table 7 stores a plurality of graphical data such as symbols which are indicated on a display 13, e.g., data composed of 8×8 dots.

A generator 14 performs a call notification for notifying a user of calling when the controller 8 detects a selective calling number the same as one of its own numbers stored in the address memory 4. The generator 14 also outputs a tone dial signal specified by the controller 8 for calling a counterpart receiver.

Operation keys 9 allow the user to select an operation, which command is sent to the controller 8 described below.

A display driver 10 drives display 13 when a message is supplied from the controller 8. The display 13 has two display lines, and depicts a message driven by the display driver 10.

A telephone directory memory 11 stores names input by the user and telephone numbers input so as to correspond to these names.

An additional information memory 12 stores sender's information. The telephone number of users are stored as the sender's information in this embodiment.

The controller 8 controls functions on transmitting and receiving.

Figure 3:
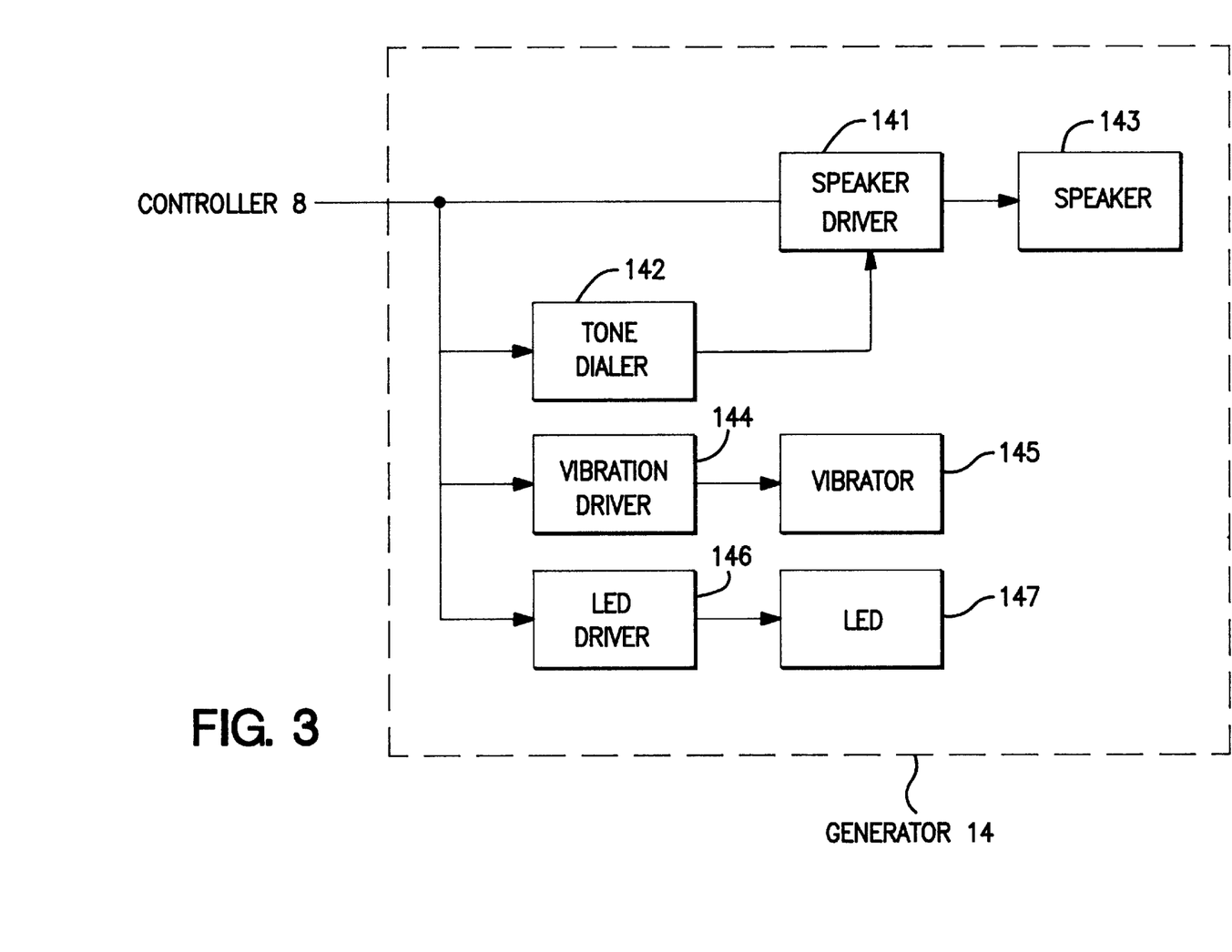
FIG. 3 is a functional block diagram of a message generator illustrated in FIG. 2.

In FIG. 3, the generator 14 includes a speaker driver 141, a tone dialer 142 and a speaker 143. The generator also includes a vibration driver 144, a vibrator 145, a LED driver 146 and a LED 147.

When the controller 8 detects a selective calling number the same as one of the receiver's own selective calling numbers, the speaker driver 141 receives a coincidence signal from the controller 8. The speaker driver 141 current-amplifies the coincidence signal and supplies the amplified signal to the speaker 143. The speaker 143 is driven by the amplified signal and generates a notifying sound.

The tone dialer 142 receives telephone dialing data from the controller 8 when the receiver makes a phone call. The tone dialer 142 converts the telephone dialing data to a dial number and outputs it to the speaker 143. The speaker 143 is driven by the dial number and generates dialling tones corresponding to the dial number.

Alternatively, when the controller 8 detects a selective calling number the same as one of the receiver's own selective calling numbers, the vibration driver 144 and the LED driver 146 receive a coincidence signal from the controller 8. Drivers 144 and 146 drive the vibrator 145 and the LED 147, respectively, and the vibrator 145 generates a vibration and the LED 147 emits light.

Figure 4:
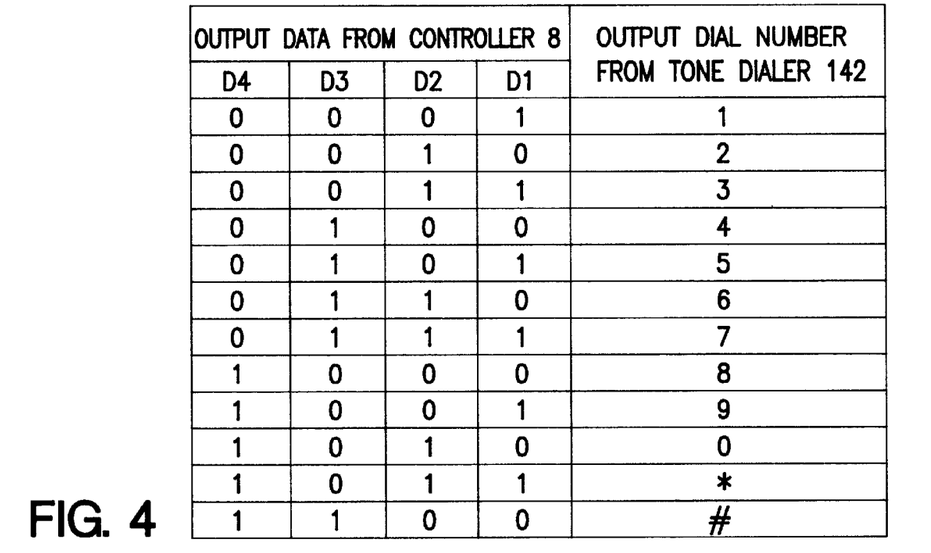
FIG. 4 is a table for explaining a conversion to dial number from dial data.

In FIG. 4, the controller 8 outputs to the tone dialer 142 data sequences D1, D2, D3 and D4 when in transmitting mode. The tone dialer 142 converts the data sequence to a dial number, e.g., when data sequence D1 1, D2 0, D3 0, D4 0 is supplied, the Dial number 1 is output.

Figure 5:
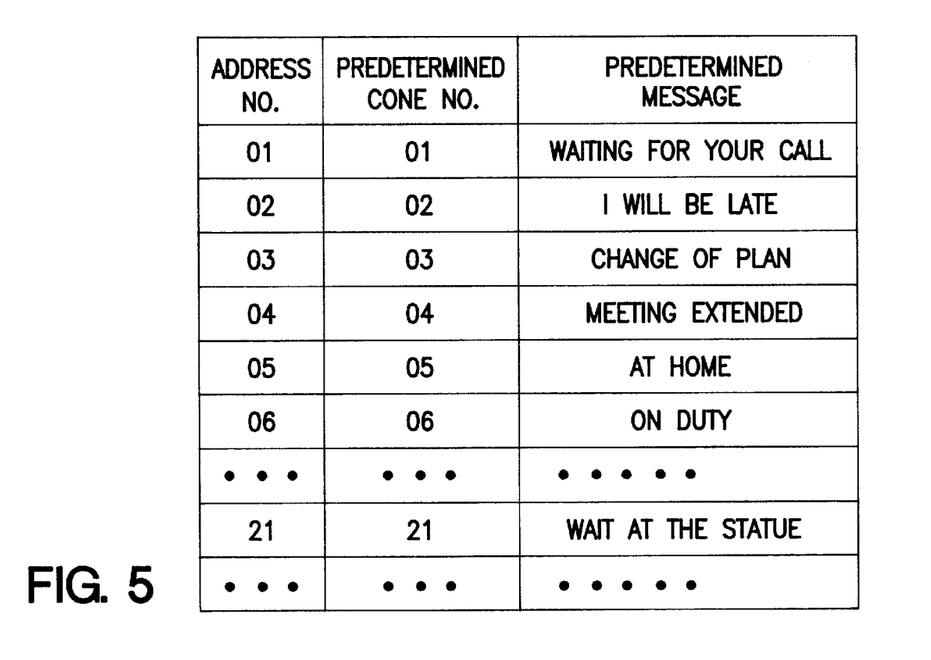
FIG. 5 is a table stored in a predetermined code message memory illustrated in FIG. 2.

In FIG. 5, the predetermined code message memory 6 stores predetermined code Nos. and predetermined messages assigned to the code Nos., one by one. As an example, the controller 8 detects the code No. 01 from the digital signal, the controller 8 specifies an address 01 and the memory 9 outputs the message "WAITING FOR YOUR CALL" assigned by the address 01 and display 13 indicates this message. Whereas, when in transmitting mode, if the user desires to transmit the message "I WILL BE LATE", the controller 8 searches this message, and detects code No. 02 assigned to this message. The detected code No. 02 is supplied to the controller 8 and transmitted to the counterpart receiver.

The predetermined message includes fixed routine phrases that are registered in the receiver in a fixed manner and free routine phrases that can be freely registered by individuals. In this Figure, the 20 routine phrases to which the code Nos. 01 to 20 are assigned corresponding to fixed routine phrases, whereas, the routine phrases to which 21 and the subsequent numbers are assigned of free routine phrases, the user can create arbitrary message.

Figure 6:
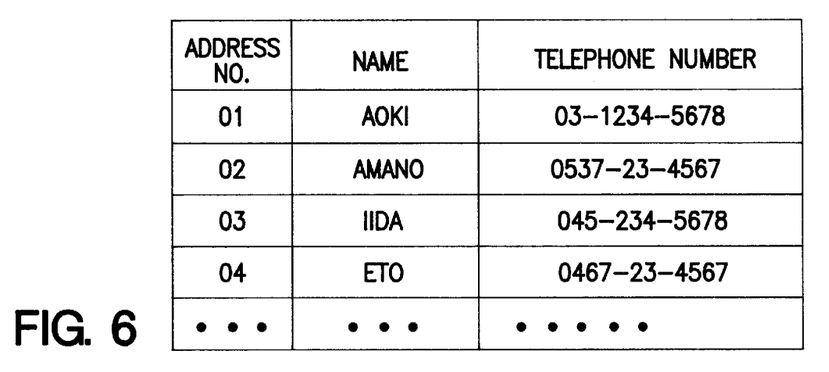
FIG. 6 is a table stored in a telephone directory memory illustrated in FIG. 2.

In FIG. 6, the telephone directory memory 11 stores names and telephone numbers assigned to the names, one by one. As an example, the controller 8 detects the telephone number "03-1234-5678" from the digital signal, the controller 8 searches this telephone number, and detects the name "AOKI" assigned to this number. The name "AOKI" is supplied to the controller 8 and displayed. Whereas, when in transmitting mode, if the user desires to make a call to the recipient "AMANO", the controller 8 searches this name, and detects the telephone number 0537-23-4567"" assigned to this name. The detected number is supplied to the controller 8 and converted to dial number at the tone dialer 142, then, speaker 143 generates the dialling tones.

Figure 7A:
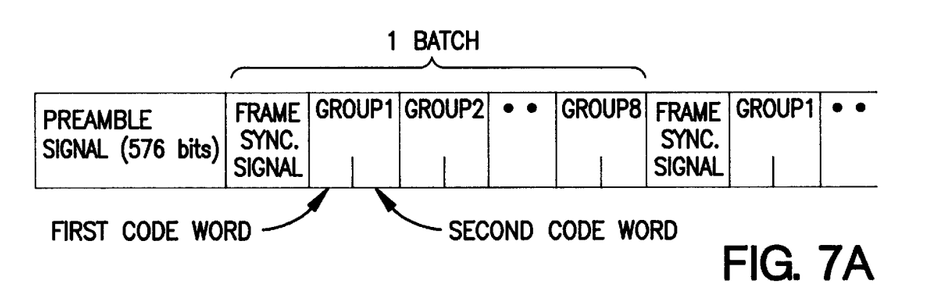
FIGS. 7(a) and 7(b) are signal formats showing an example of a radio signal received by the receiver according to the present invention.

In FIG. 7(a), a radio signal transmitted from the base station is constituted by a 576-bit preamble signal and a 32-bit frame sync. signal following the preamble signal. The preamble signal and the sync. signal are used for achieving synchronization of the receiver with the base station.

The receiver belongs to one of several groups, and its own selective calling number is transmitted only in a time assigned to the group that the receiver belongs to. After turning on the power supply and receiving the preamble signal and the sync. signal for achieving synchronization, the receiver may therefore perform reception only in a time assigned to the group that the receiver belongs to.

A group 1 is transmitted to the receiver after the transmission of a frame sync. signal. In FIG. 7(a), a frame sync. signal and eight groups make up one batch, and one group consists of two code words.

After one batch is transmitted, another batch is transmitted to the receiver.

Figure 7B:
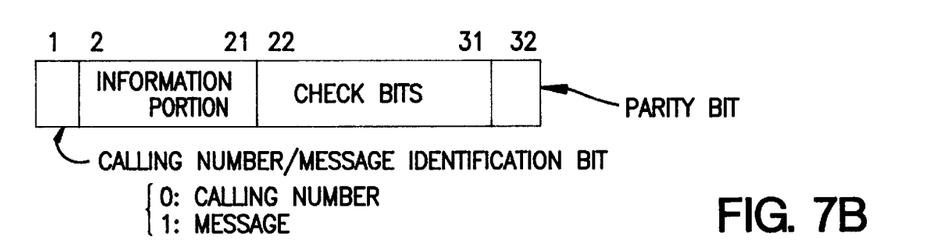

Each code word is constituted as shown in FIG. 7(b). That is, the code word consists of 32 bits in total and is made up of a calling number/message identification bit (simply referred to as "identification bit" hereinbelow), information bits, check bits and a parity bit in the mentioned order.

The identification bit is one bit and is used for judging whether the code word represents a selective calling number or represents the message, with the code word representing the selective calling number when the bit is 0, whereas, the same representing the message when the bit is 1.

The information portion is 20 bits, and a selective calling number is recorded in the information portion when the identification bit is 0, whereas the message is recorded in the information portion when the identification bit is 1.

The check bits consist of 10 bits and the parity bit consists of one bit, namely a transmission error is corrected by using a (31, 20)+1 BCH signal.

Figure 8:
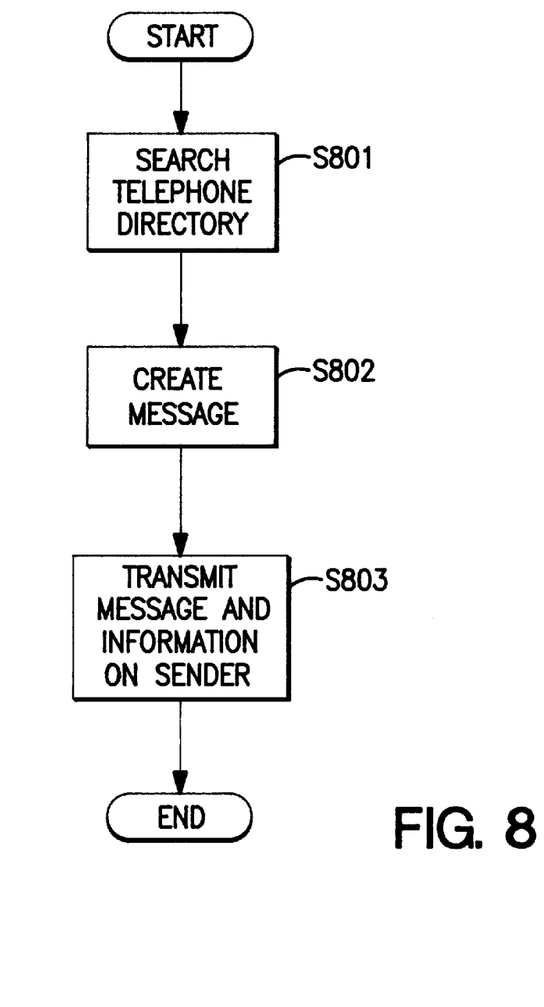
FIG. 8 is a flowchart for explaining a process of transmitting a message and sender's information according to the present invention.

In FIG. 8, when in transmitting mode, the receiver (the sender) searches a telephone number of a counterpart (the recipient) from the telephone directory memory 11 (STEP S801). After searching the number of the recipient, the message is created (S802) and the dialling tones corresponding to the recipient's telephone number are generated from speaker 143. Continuously, the dialling tones corresponding to the predetermined code No. assigned to the created message and the sender's telephone number are transmitted (S803).

The transmitted recipient's telephone number, created message and sender's telephone number are received by the recipient through base stations, exchangers, and a telephone line.

The recipient detects the recipient's telephone number as its own selective calling number, thus, speaker 143, vibrator 145, and/or LED 147 perform call notification. After that, the predetermined code No. assigned to the created message and the sender's telephone number are detected. The detected predetermined code No. is converted to the predetermined message and displayed. Also, the detected sender's telephone number is converted to the name assigned to the number and displayed.

Figure 9:
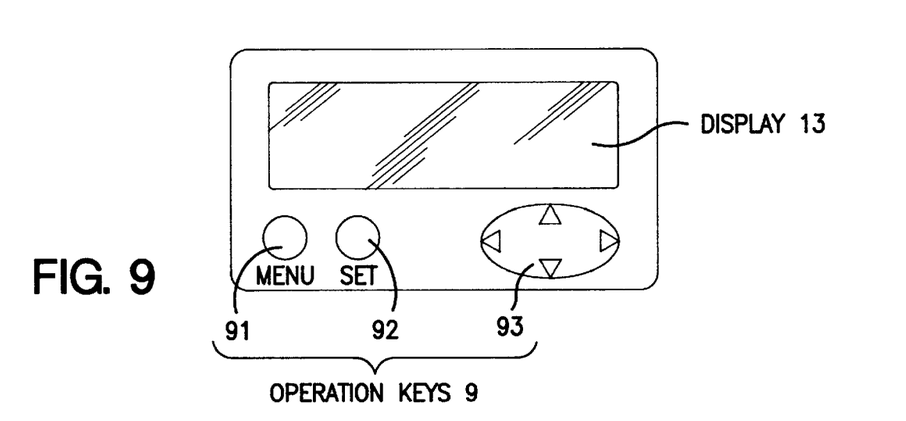
FIG. 9 is a front view showing the appearance of the receiver according to the present invention.

In FIG. 9, the operation keys 9 include MENU key 91, SET key 92 and CURSOR key 93.

Figure 10A:
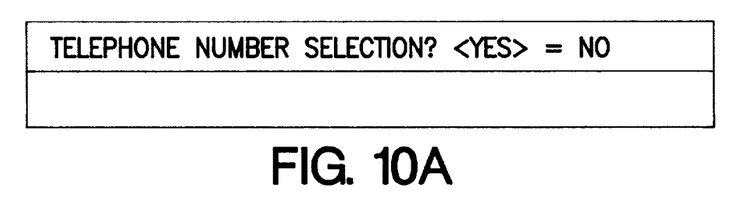
FIGS. 10(a)–10(j) describe an example of a procedure for a user to create and transmit a message using the receiver according to the present invention.

In FIG. 10, at the first, the user presses the MENU key 91 to switch to a display shown in FIG. 10(a). This display asks whether the user will use the telephone numbers registered in the telephone directory memory 11. When the user then presses the '<' key of CURSOR 93, the telephone numbers registered in the telephone directory memory 12 are retrieved.

Figure 10B:
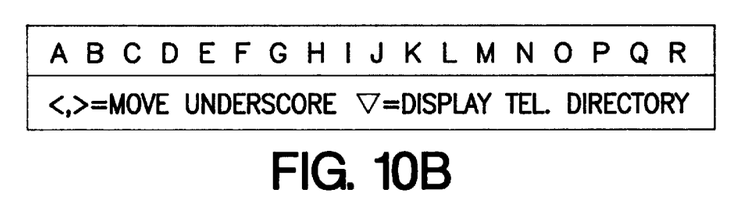

In FIG. 10(b), the top row in the screen sequentially displays the alphabet. The user presses the '<' and '>' keys of the CURSOR 93 to select a top letter of name of the recipient, and uses the '∇' key to search the recipients name whose top letter is selected (the "A" line is assumed to be selected in this embodiment). The names beginning with the selected top letter are displayed as shown in FIG. 10(c).

Figure 10C:
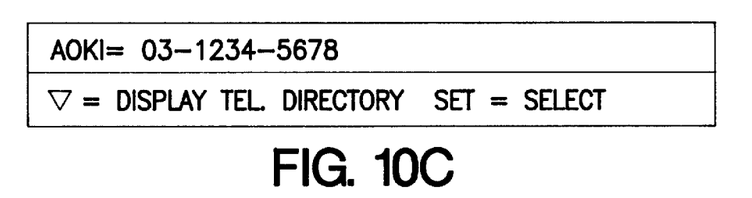

In FIG. 10(c), "Aoki: 03-1234-5678" is shown. When the user presses the 'Δ' and '∇' keys, the next candidate, for example, "AMANO: 0537-23-4567" is displayed. When the user presses the set key 92 while the screen in FIG. 10(c) is being displayed, the screen switches to one such as shown in FIG. 10(d) to indicate that "Aoki: 03-1234-5678" has been selected.

Figure 10D:
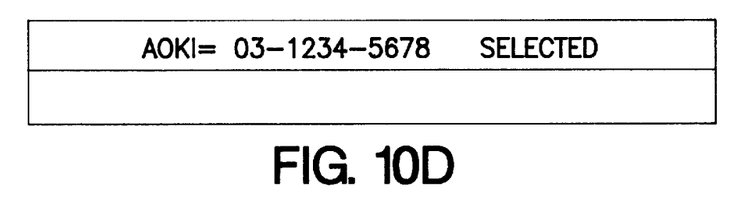
Figure 10E:
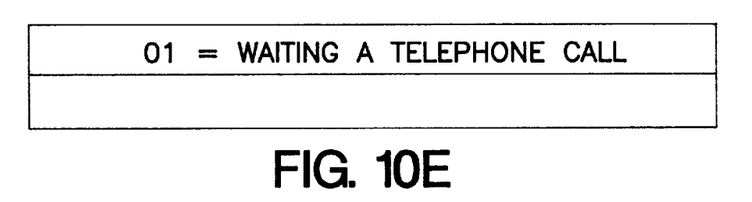
Figure 10F:
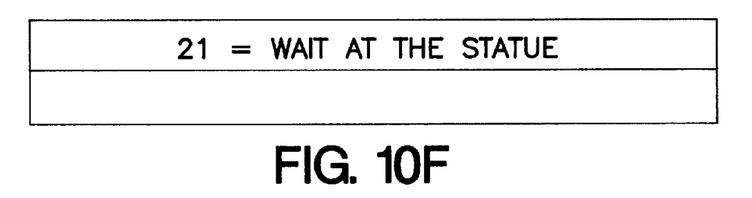

If the user then presses the '<' key, when the display shown in FIG. 10(d) is indicated, the screen switches to one such as shown in FIG. 10(e), and allows a transmission message to be selected. The user presses the 'Δ' and '∇' keys to select a message to be transmitted. In this example, the user presses the '∇' key 20 times to select the free routine phrase "WAIT AT THE STATUE" to which the predetermined code No. 21 in FIG. 5 is assigned. When the user presses the '∇' key 20 times, the code No. 21 and the free routine phrase "WAIT AT THE STATUE" are displayed in the top row in the display 13 as shown in FIG. 10(f).

Figure 10G:
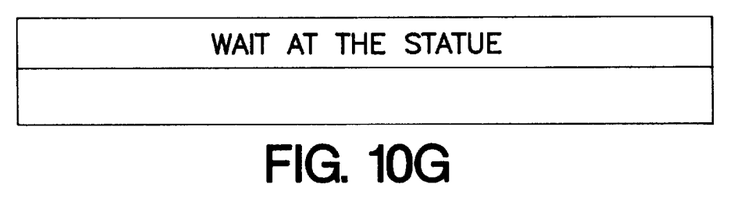
Figure 10H:
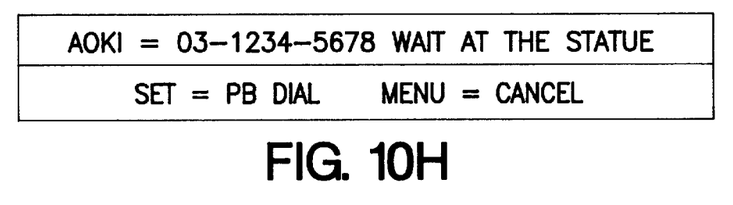

When the user holds down the SET 92 for two seconds, the free routine phrase "WAIT AT THE STATUE" is selected and this phrase is displayed shown in FIG. 10(g). Then, the transmission message creation mode is finished. After a specified period of time, the selected telephone number and transmitted message through the series of operations are displayed as shown in FIG. 10(h), which is then switched to the one that allows the selection of whether or not to generate a tone dial for the telephone number.

Figure 10I:
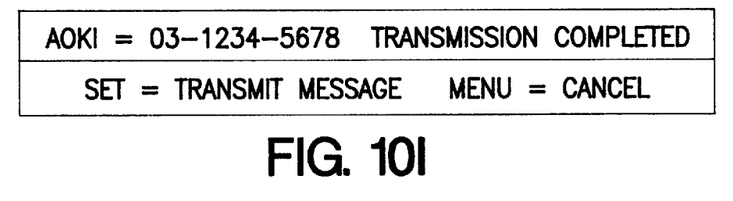
Figure 10J:
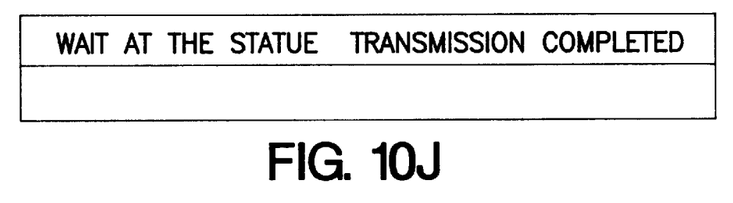

When the user presses the SET 92 while this screen remains displayed, the dial tone of the selected telephone number is completed and the display asks whether or not the transmission of messages will be continued as shown in FIG. 10(i). If the user presses the SET 92, the tone dial of the predetermined code No. assigned to the created message is transmitted, and the completion of the transmission is displayed in the bottom row in the screen as shown in FIG. 10(j).

Although not illustrated, not only the message but also information on the sender, this is to say, the telephone number of the sender is transmitted, as shown in step S803 in FIG. 8. Thus, the sender need not separately provide for transmission of this information.

Figure 11:
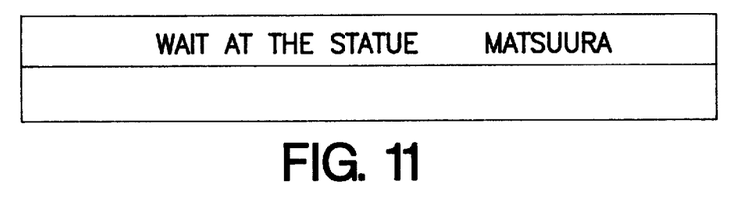
FIG. 11 shows an example of a description on a display illustrated in FIG. 2 during reception.

In FIG. 11, when the recipient receives its own selective calling number, the recipient displays, as shown in this figure, the message from the sender (in this example, "WAIT AT THE STATUE") in the left of the top row in the screen, and the information on the sender (in this example, sender's name assigned to the sender's telephone number "MATSUURA") is shown in the right of the top row in the screen.

Figure 12:
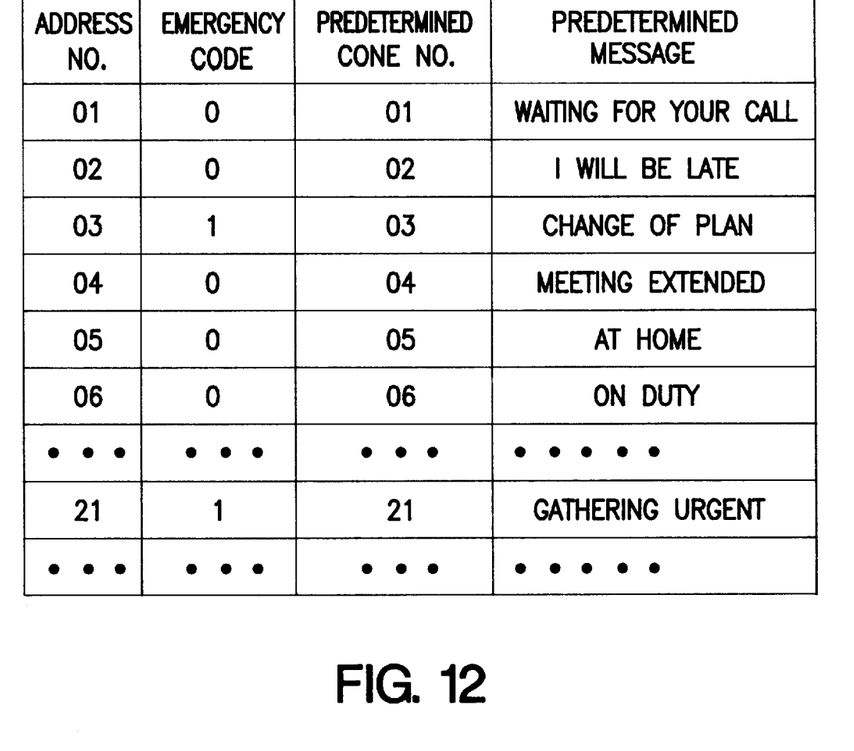
FIG. 12 is another table stored in a predetermined code message memory according to the second embodiment.

In the second embodiment shown in FIG. 12, the predetermined code message memory 6 stores emergency codes, predetermined code Nos. and predetermined messages. The emergency message, for example, the message "CALL ME SOON" is assigned to an emergency code 01. Thus, when the recipient receives the predetermined code assigned to the emergency message, the recipient can judge an emergency call. If the emergency code is detected, all of call notification circuit, the speaker 143, the vibration 145 and the LED 147 perform the call notification as an emergency call.

Figure 13:
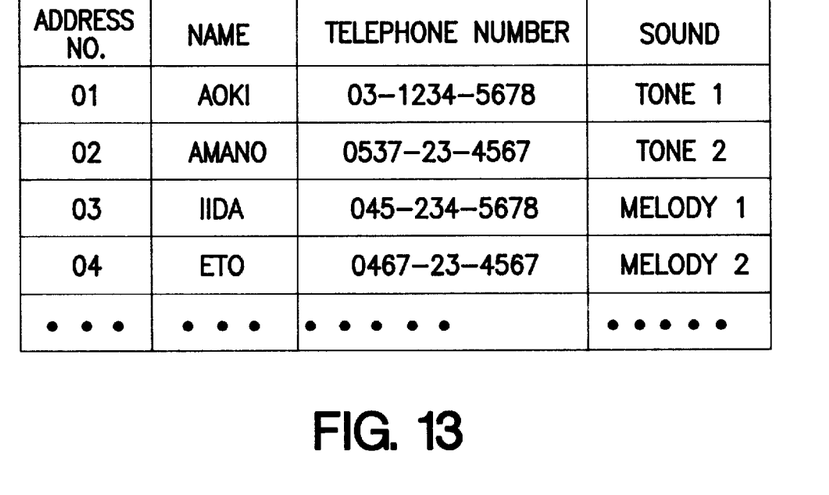
FIG. 13 is another table stored in a telephone directory memory according to the third embodiment.

As shown in FIG. 13, in the third embodiment, the telephone directory memory 11 stores names, telephone numbers and sounds as an example of an indicator of call notification. The sound is assigned to the name, one by one, thus, when the recipient receives the sender's telephone number, the recipient receiver generates the particular sound assigned to the number. Hence, in this embodiment, the recipient can know who is calling without seeing the display 10.

Figure 14:
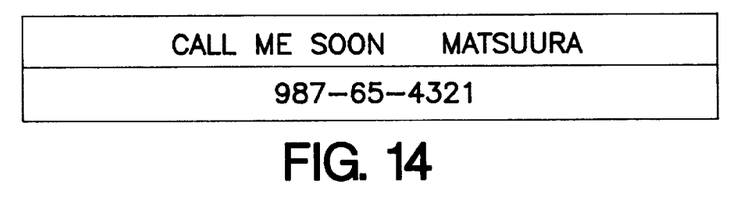
FIG. 14 shows another example of a description on a display during reception according to the fourth embodiment.

In FIG. 14 which shows the fourth embodiment, the user can know the telephone number of the sender, since the recipient receiver displays that number as well.

As described above, the present invention enables the user to transmit a message using operations similar to conventional ones and to transmit information identifying the sender.

In addition, since the information on the sender and the message are displayed in the receiver, the recipient need not confirm the sender or the information that the sender desires to communicate.

Although in the embodiments, the message assigned to the received code No. is displayed, it is however possible to directly show on the display 13 the code No., depending on the contents of the message.

In addition, although the above embodiments select a transmission message from the routine phrase messages stored in the predetermined code message memory 6, the operation key 9 can be used to select from the characteristic information stored in the matrix table 7 to create a message.

Further, although in the embodiments, the information on the sender is its telephone number, it is however possible to transmit the name of the sender directly.

Furthermore, although, in these embodiments the signal format of the radio signal to be received by the receiver has been described as that of the POCSAG signal, the present invention can applied to other signal formats such as the NTT system signal, the ERMES signal or any kind of signal which is capable of transmitting the predetermined code Nos.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A selective calling receiver comprising:
   a telephone directory memory for storing a telephone directory of recipients to whom messages will be sent;
   a message generator for composing a message to be transmitted;
   an additional information memory for storing information identifying at least one of said receiver and a user of said receiver;
   a tone dialer for, in a transmission mode: (i) converting a selected telephone number stored in said telephone directory memory to a tone number, (ii) converting said identifying information to a tone number when said message is created, and, (iii) after conversion of said identifying information, said tone dialer converting said transmitting message to a tone number; and
   a speaker, driven by the tone numbers generated by said tone dialer, for generating dialling tones,
   said selective calling receiver being designed and adapted to Perform said conversion of said identifying information to a tone number without user input prior to each transmission.

2. The receiver claimed in claim 1, wherein said additional information memory stores a telephone number of the user.

3. The receiver claimed in claim 1, wherein said message generator comprises a predetermined code message memory for storing a plurality of predetermined code numbers and a plurality of predetermined messages assigned to said plurality of predetermined code numbers, one by one.

4. The receiver claimed in claim 3, wherein said message generator further comprises operation keys, operated by the user, for selecting said transmitting message from said plurality of predetermined messages, said operation keys being also operated when the telephone number of the recipient is selected from said telephone directory.

5. The receiver claimed in claim 3, wherein said predetermined code message stores an emergency code number for indicating a emergency message.

6. A selective calling receiver of claim 1 further comprising:
   a judgement circuit for judging whether a received radio signal includes a selective calling number the same as the receiver's own selective calling number,
   a detector for detecting a message and sender's information from said radio signal when said judgement circuit judges the received selective calling number is the same as said own selective calling number,
   a display for displaying the detected message and sender's information, and
   a call notification circuit for notifying a user of calling.

7. The receiver claimed in claim 6, wherein said detector detects a telephone number of said sender as said sender's information.

8. The receiver claimed in claim 7, wherein said display indicates said telephone number of said sender.

9. The receiver claimed in claim 6, further comprising:
   a telephone directory memory for storing a plurality of telephone numbers and a plurality of names assigned to said plurality of telephone numbers; and
   a converter for converting said telephone number of said sender to the name assigned to said telephone number, and wherein said display indicates the converted name.

10. The receiver claimed in claim 9, wherein said display indicates said telephone number of the sender and said name assigned to said telephone number.

11. The receiver claimed in claim 9, wherein said telephone directory memory further stores a notification indicator assigned to said plurality of telephone numbers; and wherein said notification circuit performs each different call notification indicated by said notification indicator.

12. The receiver claimed in claim 11, wherein said notification circuit comprises a speaker for generating an alarm sound, and said speaker generates each different sound indicated by said notification indicator.

13. The receiver claimed in claim 9, further comprising a tone dialling circuit, said tone dialling circuit accessing said telephone directory memory to generate dialling tones for transmitting a message to a counterpart receiver whose telephone number is stored in said telephone directory memory.

14. The receiver claimed in claim 6, further comprising a predetermined code message memory for storing a plurality of predetermined code numbers and a plurality of predetermined messages assigned to said plurality of predetermined code numbers one by one, and wherein said display indicates a predetermined message assigned to said predetermined code number which is detected by said detector as the received message.

15. The receiver claimed in claim 14, wherein said predetermined code message memory further stores an emergency code number for indicating a emergency message, and wherein said notification circuit performs emergency call notification when the received message is said emergency message.

16. The receiver claimed in claim 6, wherein said notification circuit comprises:
   a speaker for generating an audible alarm;
   a vibrator for generating vibration; and
   an LED for emitting light.

17. The receiver claimed in claim 16, wherein all of said speaker, said vibrator and said LED perform call notification when the receiver receives an emergency call.

* * * * *